United States Patent
Lu et al.

(10) Patent No.: US 11,570,717 B2
(45) Date of Patent: Jan. 31, 2023

(54) WAKING UP A TERMINAL TO RECEIVE AN ULTRASONIC SIGNAL IN REPONSE TO SENSOR DATA

(71) Applicant: BEIJING XIAOMI MOBILE SOFTWARE CO., LTD., Beijing (CN)

(72) Inventors: Wei Lu, Beijing (CN); Runyu Shi, Beijing (CN); Kai Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/214,391

(22) Filed: Mar. 26, 2021

(65) Prior Publication Data
US 2021/0410070 A1 Dec. 30, 2021

(30) Foreign Application Priority Data
Jun. 29, 2020 (CN) .......................... 202010605080.9

(51) Int. Cl.
*H04W 52/02* (2009.01)
(52) U.S. Cl.
CPC .............................. *H04W 52/0254* (2013.01)
(58) Field of Classification Search
CPC ................. H04W 52/00; H04W 52/02; H04W 52/0209; H04W 52/0225; H04W 52/0251; H04W 52/0254; G06Q 20/145; G06Q 20/3224; G06Q 20/3227; G06Q 20/3263; G06Q 20/3272; G06F 1/1694; G06F 1/3215; G06F 1/3231; G06F 1/3287; Y02D 10/00
See application file for complete search history.

(56) References Cited

U.S. PATENT DOCUMENTS

| | | |
|---|---|---|
| 9,009,516 B1 | 4/2015 | Gabayan et al. |
| 2018/0027077 A1* | 1/2018 | Melodia ................. H04L 67/12 370/254 |
| 2018/0101711 A1* | 4/2018 | D'Souza .............. G06V 30/142 |
| 2020/0158556 A1 | 5/2020 | Strutt et al. |
| 2021/0072378 A1* | 3/2021 | Shin ........................ G01S 15/42 |

FOREIGN PATENT DOCUMENTS

CN 103806902 A 5/2014

OTHER PUBLICATIONS

Extended European Search Report in the European Application No. 21164840.7 dated Sep. 28, 2021, (7p).
https://www.zhihu.com/question/20946901, The sound wave that pays treasure pays (face to face pays) what principle is?

* cited by examiner

Primary Examiner — Keith Ferguson
(74) Attorney, Agent, or Firm — Arch & Lake LLP (57) ABSTRACT

A method, a terminal, and a storage medium are provided for controlling a functional circuit. In the method, the terminal acquires sensor data information of a sensor. Further, the terminal wakes up the functional circuit in the terminal to receive an ultrasonic signal in response to determining that the acquired sensor data information meets a preset condition.

16 Claims, 4 Drawing Sheets

WAKING UP A TERMINAL TO RECEIVE AN ULTRASONIC SIGNAL IN REPONSE TO SENSOR DATA

CROSS-REFERENCE TO RELATED APPLICATION

The present application is based upon and claims priority to Chinese Patent Application No. 202010605080.9, filed on Jun. 29, 2020, the entire content of which is incorporated herein by reference for all purposes.

TECHNICAL FIELD

The present disclosure relates to the field of terminal processing, and more particularly, to a method and apparatus for controlling a functional module, and a storage medium.

BACKGROUND

In a related art, terminal devices such as mobile phones have increasingly more functions like data receiving and processing, expense payment and so on. For the purpose of implementing these functions, for example, implementing the expense payment, the terminal device is in a receiving state all the time necessarily, which causes the very large power consumption. Or, the terminal device is processed manually to turn on a payment interface for payment, which causes the poor user experience.

To provide a method for quickly and conveniently controlling a functional module is a problem to be solved urgently.

SUMMARY

According to a first aspect of the embodiments of the present disclosure, a method for controlling a functional module is provided. The method includes that a terminal acquires sensor data information of a sensor. Further, the terminal wakes up the functional circuit in the terminal to receive an ultrasonic signal in response to determining that the acquired sensor data information meets a preset condition.

According to a second aspect of the embodiments of the present disclosure, a terminal is provided. The terminal includes a processor and a memory configured to store instructions executable by the processor. The processor is configured to acquire sensor data information of a sensor and wake up a functional circuit in the terminal to receive an ultrasonic signal in response to determining that the acquired sensor data information meets a preset condition.

According to a third aspect of the embodiments of the present disclosure, a non-transitory computer-readable storage medium is provided. Instructions in the storage medium being executed by a processor of a mobile terminal cause the mobile terminal to perform acts including that sensor data information of a sensor is acquired and a functional circuit is waked up to receive an ultrasonic signal in response to determining that the acquired sensor data information meets a preset condition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
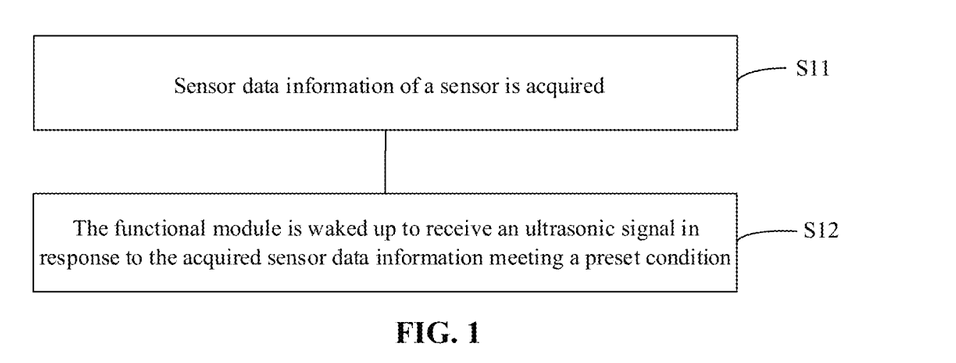
FIG. 1 is a flow chart showing a method for controlling a functional module, according to an exemplary embodiment.

FIG. 1 is a flow chart showing a method for controlling a functional module, according to an exemplary embodiment. As illustrated in FIG. 1, the method for controlling the functional module may be applied to a terminal, and include the following operations. In some examples, the functional module may include a functional circuit, a functional unit, a functional component, etc.

At S11, sensor data information of a sensor is acquired.

At S12, the functional module is waked up to receive an ultrasonic signal in response to the acquired sensor data information meeting a preset condition.

In the method for controlling the functional module provided by the present disclosure, whether the functional module is waked up is determined by determining whether the acquired sensor data information of the sensor of the terminal meets the preset condition, such that the functional module receives ultrasonic information.

With the payment function of the terminal as an example, the terminal may include an ultrasonic receiver; when the terminal needs to pay expenses, the sensor of the terminal acquires sensor data information; and if the acquired sensor data information meets a preset condition, a corresponding functional module of the terminal is waked up to receive an ultrasonic signal. The ultrasonic signal includes payment instruction information.

In the method for controlling the functional module provided by the present disclosure, the wake-up condition of the functional module is set, i.e., when the preset condition is met, the corresponding functional module is waked up to be in a working state, thereby reducing the power loss of the terminal and improving the user experience.

Figure 2:
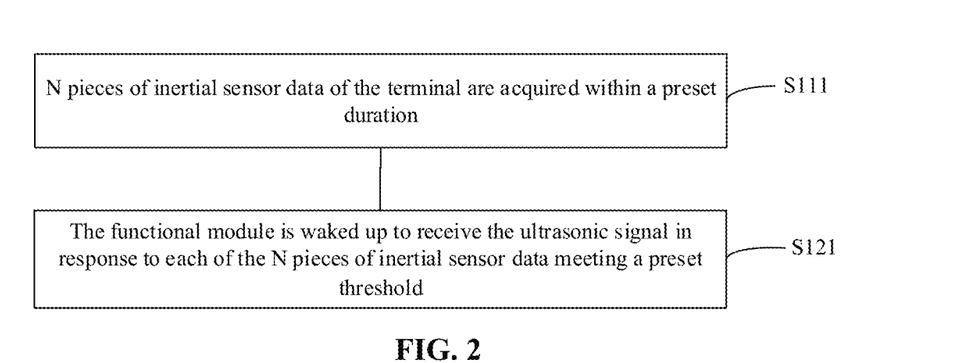
FIG. 2 is a flow chart showing a method for controlling a functional module, according to an exemplary embodiment.

According to the method for controlling the functional module provided by the embodiments of the present disclosure, the sensor data information includes inertial sensor data. As illustrated in FIG. 2, FIG. 2 is a flow chart showing a method for controlling a functional module, according to an exemplary embodiment. The method may include the following operations.

The operation S11 that the sensor data information of the sensor is acquired may include the following operation.

At S111, N pieces of inertial sensor data of the terminal are acquired within a preset duration, the N being a positive integer greater than or equal to 1.

The operation S12 that the functional module is waked up to receive the ultrasonic signal in response to the acquired sensor data information meeting the preset condition may include the following operation.

At S121, the functional module is waked up to receive the ultrasonic signal in response to each of the N pieces of inertial sensor data meeting a preset threshold.

In the method for controlling the functional module provided by the present disclosure, the to-be-called functional module is controlled based on the inertial sensor data.

N pieces of inertial sensor data of the terminal are acquired within a preset duration; and the functional module is waked up to receive the ultrasonic signal in response to each of the N pieces of inertial sensor data meeting the preset threshold.

With the payment function of the terminal as the example, when the terminal needs to pay expenses, N pieces of inertial sensor data of the terminal may be acquired within a preset duration; and when each of the N pieces of inertial sensor data meets a preset threshold, it is determined that a condition for waking up the functional module receiving the ultrasonic signal is met, and a wake-up instruction is sent to the functional module receiving the ultrasonic signal, so as to wake up the functional module receiving the ultrasonic signal to receive the ultrasonic signal, i.e., receive payment instruction information. The functional module may be any functional module capable of receiving the ultrasonic signal. For example, the ultrasonic receiver of the terminal includes an ultrasonic receiving module, and the ultrasonic receiving module receives the ultrasonic signal.

The terminal may be a mobile terminal, such as a mobile phone, a personal digital assistant (PDA), a notebook computer or the like.

In the method for controlling the functional module provided by the present disclosure, the to-be-waked functional module is waked up based on the inertial sensor data, such that the operation difficulty is reduced, and the user experience is improved.

According to the method for controlling the functional module provided by the embodiment of the present disclosure, the N pieces of inertial sensor data may include N pieces of acceleration sensor data, and each piece of acceleration sensor data may include acceleration sensor data of the terminal on an X axis, acceleration sensor data of the terminal on a Y axis and acceleration sensor data of the terminal on a Z axis. The operation that the functional module is waked up to receive the ultrasonic signal in response to each of the N pieces of inertial sensor data meeting the preset threshold may include the following operation.

The functional module is waked up to receive the ultrasonic signal in response to the acceleration sensor data of the terminal on the X axis, the acceleration sensor data of the terminal on the Y axis and the acceleration sensor data of the terminal on the Z axis respectively meeting corresponding first preset thresholds.

The functional module is waked up to receive the ultrasonic signal in response to the N pieces of inertial sensor data includes the N pieces of acceleration sensor data, and the acceleration sensor data of the terminal on the X axis, the acceleration sensor data of the terminal on the Y axis and the acceleration sensor data of the terminal on the Z axis in each piece of acceleration sensor data respectively meeting the corresponding first preset thresholds.

With the payment function of the terminal as the example, when the terminal needs to pay expenses, the terminal may be disposed nearby the cashier device according to a preset mode. The preset mode may be any setting mode convenient for the user to pay expenses, and may be, for example, a mode in which the terminal forms a preset angle with the horizontal plane, with the screen downward. In order to prevent misoperation during the payment of the terminal, the preset mode may also be a mode in which the terminal is inverted and forms a preset angle with the horizontal plane, with the screen downward. The inversion of the terminal is an unconventional setting mode of the terminal and is intended to avoid falsely calling a related module during the operation of the mobile phone. By setting the preset mode into such an unconventional mode in which the terminal is inverted, the accuracy and security for determining that the functional module is waked up may be improved.

Figure 3:
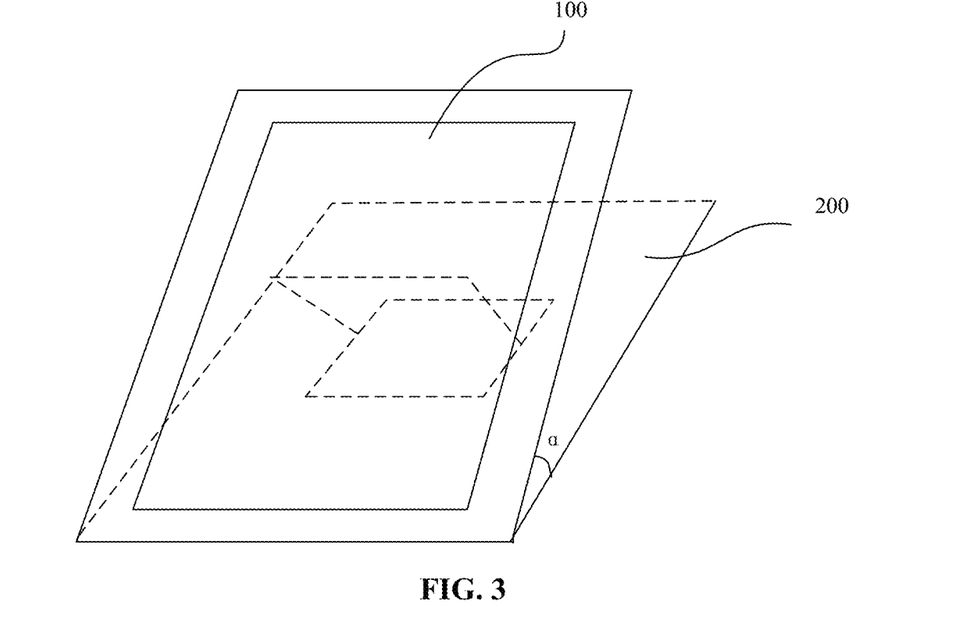
FIG. 3 is a schematic diagram of a preset setting mode of a terminal provided in an exemplary embodiment.

As illustrated in FIG. 3, FIG. 3 is a schematic diagram of a preset setting mode of a terminal provided in an exemplary embodiment. The preset setting mode may be a mode in which the terminal 100 is inverted and forms an a angle with the horizontal plane, with the screen downward. When the terminal is horizontally placed, the X axis is a width direction of the terminal, the Y axis is a length direction of the terminal, and the Z axis is a direction perpendicular to the horizontal plane.

For the ease of payment in the preset mode, the terminal may be set according to the preset mode in which the terminal is inverted and forms the preset angle with the horizontal plane, with the screen downward. In order to maintain the terminal at the preset angle within the preset duration, any mode may be used, such as the example illustrated in FIG. 3 that the terminal 100 maintains to form the preset a angle with the horizontal plane through the support 200, such that the terminal maintains the mode unchanged within the preset duration.

Each of the first preset thresholds may be a specific value, and may also be a numerical range. For example, the preset mode may be a mode in which the terminal is inverted and forms an a angle with the horizontal plane. In the preset mode, the acceleration sensor data of the terminal in the X-axis direction is 0, the acceleration sensor data of the terminal in the Y-axis direction is $-g*\sin \alpha$, and the acceleration sensor data of the terminal in the Z-axis direction is $g*\cos \alpha$, the g being the gravitational acceleration. Therefore, it may be appropriate to respectively set the first preset threshold of the acceleration sensor data of the terminal in the X-axis direction as 0 or 0±0.2, the first preset threshold of the acceleration sensor data of the terminal in the Y-axis direction as $-g*\sin \alpha$ or $-g*\sin \alpha \pm 0.2$, and the first preset threshold of the acceleration sensor data of the terminal in the Z-axis direction as $g*\cos \alpha$ or $g*\cos \alpha \pm 0.2$.

If the acquired N pieces of acceleration sensor data of the terminal in the X-axis direction, acceleration sensor data of the terminal in the Y-axis direction and acceleration sensor data of the terminal in the Z-axis direction are in the first preset threshold range within the preset duration, it is determined that the terminal meets the to-be-paid condition in the present state, that is, the terminal meets the condition for waking up the functional module receiving the payment instruction information, and the wake-up instruction is sent to the functional module receiving the payment instruction information, so as to wake up the functional module receiving the payment instruction information to receive the ultrasonic signal, i.e., the payment instruction information.

Figure 4:
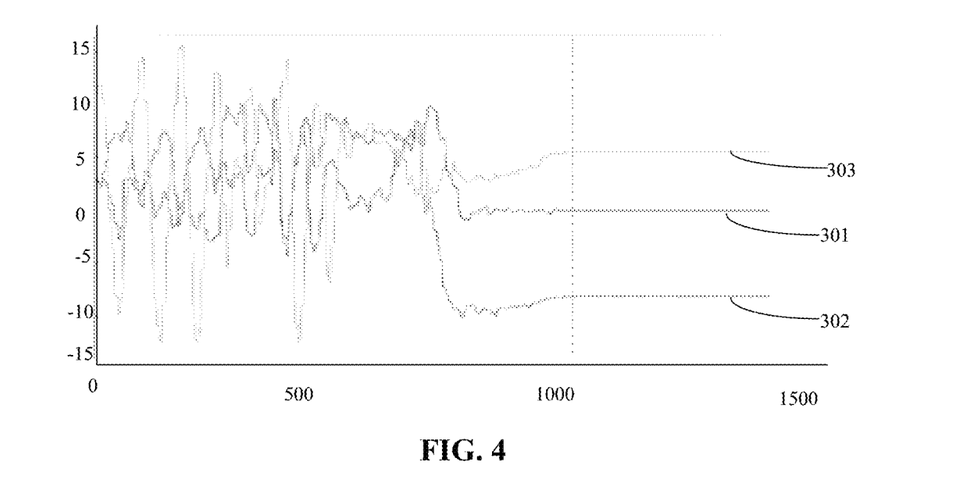
FIG. 4 is a schematic diagram of acceleration sensor data of a terminal in another mode and meeting a module call condition provided in an exemplary embodiment.

As illustrated in FIG. 4, FIG. 4 is a schematic diagram of acceleration sensor data of a terminal in another mode and a preset mode provided in an exemplary embodiment. The x axis is the time axis with the unit of ms, and the y axis is the acceleration with the unit of m/s². When the terminal is in the another mode, the another mode may be a mode in which the terminal is held by the user. When the terminal is used for other operations, the terminal moves continuously, such that the acceleration sensor data of the terminal in the X-axis direction, the acceleration sensor data in the Y-axis direction and the acceleration sensor data in the Z-axis direction are ever-changing. As can be seen from FIG. 4, within a time period in front of the time where the dotted line is located, the acceleration sensor data 301 of the terminal in the X-axis direction, the acceleration sensor data 302 in the Y-axis direction and the acceleration sensor data 303 in the Z-axis direction are ever-changing.

When the terminal is in the preset mode, the terminal is inverted and forms the a angle with the horizontal plane, with the screen downward. The terminal stands in the preset mode for a period of time. The acceleration sensor data 301 of the terminal in the X-axis direction is 0, the acceleration sensor data 302 in the Y-axis direction is $-g*\sin \alpha$ and the acceleration sensor data 303 in the Z-axis direction is $g*\cos \alpha$. Within a time period in rear of the time where the dotted line illustrated in FIG. 4 is located, the acceleration sensor data 301 of the terminal in the X-axis direction, the acceleration sensor data 302 in the Y-axis direction and the acceleration sensor data 303 in the Z-axis direction are all maintained at same or nearly same values. Within the time period in rear of the time where the dotted line is located, the acquired N pieces of acceleration sensor data all meet the first preset thresholds within the preset duration, and thus the terminal meets the condition for waking up the functional module.

According to the method for controlling the functional module provided by the embodiment of the present disclosure, the N pieces of inertial sensor data may include N pieces of angular velocity sensor data, and each piece of angular velocity sensor data may include angular velocity sensor data of the terminal on the X axis, angular velocity sensor data of the terminal on the Y axis and angular velocity sensor data of the terminal on the Z axis. The operation that the functional module is waked up to receive the ultrasonic signal in response to each of the N pieces of inertial sensor data meeting the preset threshold may include the following operation.

The functional module is waked up to receive the ultrasonic signal in response to the angular velocity sensor data of the terminal on the X axis, the angular velocity sensor data of the terminal on the Y axis and the angular velocity sensor data of the terminal on the Z axis respectively meeting corresponding second preset thresholds.

The functional module is waked up to receive the ultrasonic signal in response to the N pieces of inertial sensor data includes the N pieces of angular velocity sensor data, and the angular velocity sensor data of the terminal on the X axis, the angular velocity sensor data of the terminal on the Y axis and the angular velocity sensor data of the terminal on the Z axis in each piece of angular velocity sensor data respectively meeting the corresponding second preset thresholds.

With the payment function of the terminal as the example, when the terminal needs to pay expenses, the terminal may be disposed nearby the cashier device according to a preset mode. For example, as illustrated in FIG. 3, FIG. 3 is a schematic diagram of a preset setting mode of a terminal provided in an exemplary embodiment. The preset setting mode may be a mode in which the terminal is inverted and forms an a angle with the horizontal plane, with the screen downward. The X axis, Y axis and Z axis are directions illustrated in FIG. 3, that is, when the terminal is horizontally placed, the X axis is the width direction of the terminal, the Y axis is the length direction of the terminal, and the Z axis is the direction perpendicular to the horizontal plane.

Each of the second preset thresholds may be a specific value, and may also be a numerical range. For example, the terminal is placed in the preset mode, the terminal is inverted and forms the a angle with the horizontal plane, with the screen downward. The angular velocity sensor data of the terminal in the X-axis direction is 0, the angular velocity sensor data of the terminal in the Y-axis direction is 0, and the angular velocity sensor data of the terminal in the Z-axis direction is 0. Therefore, it may be appropriate to respectively set the second preset threshold of the angular velocity sensor data of the terminal in the X-axis direction as 0 or 0±0.2, the second preset threshold of the angular velocity sensor data of the terminal in the Y-axis direction as 0 or 0±0.2, and the second preset threshold of the angular velocity sensor data of the terminal in the Z-axis direction as 0 or 0±0.2.

If the acquired N pieces of angular velocity sensor data of the terminal in the X-axis direction, angular velocity sensor data of the terminal in the Y-axis direction and angular velocity sensor data of the terminal in the Z-axis direction are in the second preset threshold range within the preset duration, it is determined that the terminal meets the to-be-paid condition in the present state, that is, the terminal meets the condition for waking up the functional module receiving the payment instruction information, and the wake-up instruction is sent to the functional module receiving the payment instruction information, so as to wake up the functional module receiving the payment instruction information to receive the payment instruction information.

Figure 5:
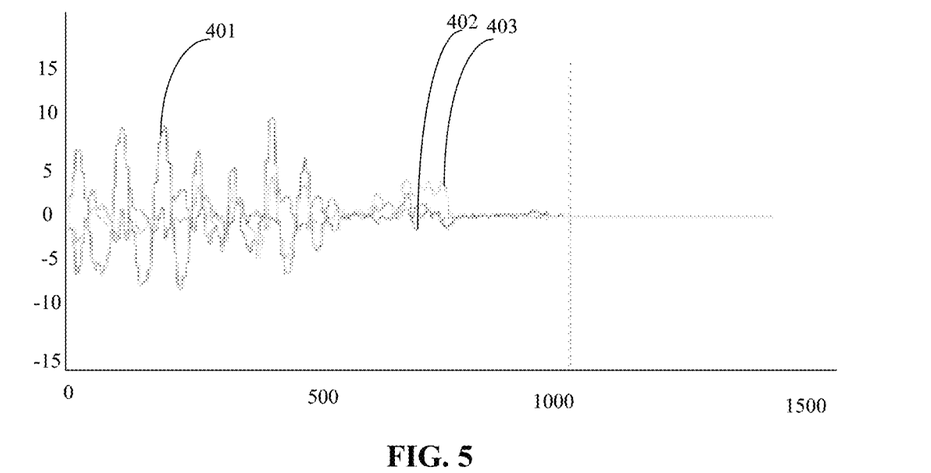
FIG. 5 is a schematic diagram of angular velocity sensor data of a terminal in another mode and a preset mode provided in an exemplary embodiment.

As illustrated in FIG. 5, FIG. 5 is a schematic diagram of angular velocity sensor data of a terminal in another mode and a preset mode provided in an exemplary embodiment. The x axis is the time axis with the unit of ms, and the y axis is the angular velocity with the unit of rad/s. When the terminal is in the another mode, the another mode may be a mode in which the terminal is held by the user. When the terminal is used for other operations, the terminal moves continuously, such that the angular velocity sensor data of the terminal in the X-axis direction, the angular velocity sensor data in the Y-axis direction and the angular velocity sensor data in the Z-axis direction are ever-changing.

When the terminal is in the preset mode, the terminal is inverted and forms the a angle with the horizontal plane, with the screen downward. The terminal stands in the preset mode for a period of time. The angular velocity sensor data of the terminal in the X-axis direction, the angular velocity sensor data in the Y-axis direction and the angular velocity sensor data in the Z-axis direction are all 0. Within a time period in rear of the time where the dotted line illustrated in FIG. 5 is located, the angular velocity sensor data 401 of the terminal in the X-axis direction, the angular velocity sensor data 402 in the Y-axis direction and the angular velocity sensor data 403 in the Z-axis direction are all 0. Within the time period in rear of the time where the dotted line is located, the acquired N pieces of angular velocity sensor data all meet the second preset thresholds within the preset duration, and thus the functional module is waked up to receive the ultrasonic signal, i.e., receive the payment instruction information.

In the method for controlling the functional module provided by the present disclosure, accelerations and angular velocities of N terminals in the X axis, Y axis and Z axis may also be acquired at the same time. When the acquired accelerations and angular velocities of N terminals in the X axis, Y axis and Z axis respectively meet corresponding preset thresholds, the condition for waking up the functional module is determined so as to increase the accuracy of determination.

According to the method for controlling the functional module provided by the embodiment of the present disclosure, the flow chart showing the method for acquiring the N pieces of inertial sensor data of the terminal within the preset duration may include the following operations.

The N pieces of inertial sensor data of the terminal are continuously acquired; and/or the N pieces of inertial sensor data of the terminal are acquired according to a preset rule.

With the preset duration, the N pieces of inertial sensor data of the terminal may be continuously acquired, and may also be acquired according to the preset rule. For example, the N pieces of inertial sensor data are acquired according to a preset time interval so as to adapt for different application scenarios.

According to the method for controlling the functional module provided by the embodiment of the present disclosure, before the N pieces of inertial sensor data of the terminal are acquired within the preset duration, the method may further include the following operation.

A trigger instruction for waking up the functional module is received.

In the method for controlling the functional module provided by the present disclosure, by receiving the trigger instruction for triggering and waking up the functional module and then determining whether to wake up the functional module, the power loss of the terminal is reduced.

With the payment function of the terminal as the example, when the terminal needs to pay expenses, after the terminal receives to-be-paid information of the cashier device, i.e., after the terminal receives a trigger instruction for waking up the module, N pieces of inertial sensor data of the terminal are acquired within the preset duration.

The method for controlling the functional module provided by the present disclosure may be applied to any scenario, such as a terminal payment scenario based on ultrasonic data transmission. The ultrasonic data transmitting terminal (the cashier device) encodes to-be-paid expense information to form an ultrasonic analog signal, and sends the ultrasonic analog signal to the receiving terminal (the terminal). The terminal receives the ultrasonic analog signal, and the received ultrasonic analog signal is equivalent to the trigger instruction for waking up the ultrasonic receiving module. Upon the reception of the trigger instruction for waking up the ultrasonic receiving module, the terminal continuously acquires N pieces of inertial sensor data within a preset duration, and the inertial sensor data includes acceleration sensor data and angular velocity sensor data. Supposing that the N is 5, i.e., 5 pieces of inertial sensor data are continuously acquired, acceleration sensor data and angular velocity sensor data acquired each time are respectively formed into sets, $P_1(Ax_1, Ay_1, Az_1, Gx_1, Gy_1, Gz_1)$, $P_2 (Ax_2, Ay_2, Az_2, Gx_2, Gy_2, Gz_2)$ . . . , and $P_5(Ax_5, Ay_5, Az_5, Gx_5, Gy_5, Gz_5)$, where Ax represents the acceleration of the terminal on the X axis, Ay represents the acceleration of the terminal on the Y axis, Az represents the acceleration of the terminal on the z axis, Gx represents the angular velocity of the terminal on the X axis, Gy represents the angular velocity of the terminal on the Y axis, and Gz represents the angular velocity of the terminal on the Z axis. Whether the $Ax_1, Ay_1, Az_1, Gx_1, Gy_1$ and $Gz_1$ in the P1 set meet corresponding preset thresholds, whether the $Ax_2, Ay_2, Az_2, Gx_2, Gy_2$ and $Gz_2$ in the P2 set meet corresponding preset thresholds . . . , and whether the $Ax_5, Ay_5, Az_5, Gx_5, Gy_5$ and $Gz_5$ in the P5 set meet corresponding preset thresholds are sequentially determined; and if yes, it is indicated that the condition for waking up the functional module receiving the ultrasonic signal is met, the wake-up instruction is sent to the functional module receiving the ultrasonic signal. After the functional module receiving the ultrasonic signal receives the wake-up instruction, the function for receiving the ultrasonic signal is turned on so as to record and receive the ultrasonic signal sent by the ultrasonic data transmitting terminal, and subsequent security verification, decoding and payment functions are completed.

According to the method for controlling the functional module provided by the present disclosure, the N pieces of inertial sensor data of the terminal are acquired within the preset duration, it is determined whether the condition for waking up the corresponding functional module is met according to the acquired N pieces of inertial sensor data of the terminal, and after the condition for waking up the corresponding functional module is met, the corresponding functional module is waked up and the corresponding function is executed, such that the terminal may automatically detect whether to wake up the corresponding functional module, the corresponding functional module is unnecessarily in a normally working state and the user also does not need to manually call the corresponding functional module. Therefore, while the power loss is saved, the operation difficulty is reduced and the user experience is improved.

According to the method for controlling the functional module provided by the embodiment of the present disclosure, the functional module may include an ultrasonic receiving module; and the operation that the functional module is waked up to receive the ultrasonic signal in response to the acquired sensor data information meeting the preset condition may include the following operation.

A wake-up instruction is sent to the ultrasonic receiving module in response to the acquired sensor data information meeting the preset condition to cause the ultrasonic receiving module to turn on a recording function to receive and record the ultrasonic signal.

In the method for controlling the functional module provided by the present disclosure, when the acquired sensor data information meets the preset condition, the ultrasonic receiving module is waked up and turned on to receive the ultrasonic signal.

Figure 6:
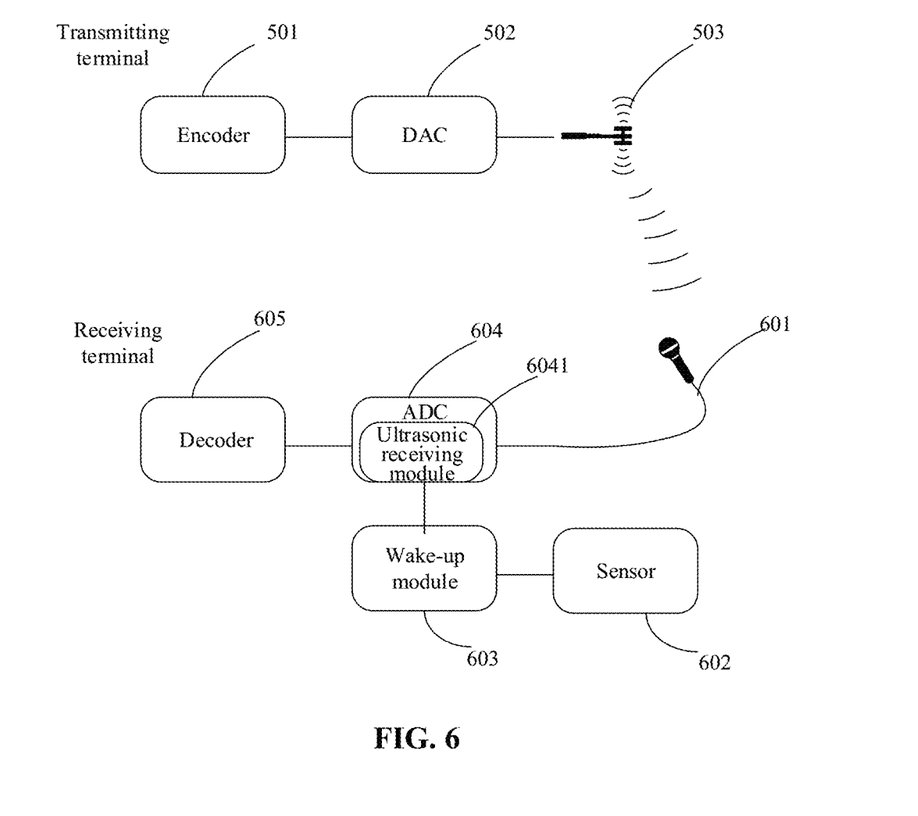
FIG. 6 is a schematic diagram that a terminal receives an ultrasonic signal, i.e., payment instruction information.

With the payment function of the terminal as the example, as illustrated in FIG. 6, FIG. 6 is a schematic diagram that a terminal receives an ultrasonic signal, i.e., payment instruction information. In FIG. 6, the payment instruction information transmitting terminal (i.e., the cashier device terminal) encodes the payment instruction information through an encoder 501 to obtain an encoded ultrasonic digital signal; the encoded ultrasonic digital signal is transmitted to the digital-to-analog converter DAC 502; and the digital-to-analog converter DAC 502 converts the encoded ultrasonic digital signal into the ultrasonic analog signal to send the ultrasonic analog signal to the ultrasonic transmitter 503. After the ultrasonic receiver 601 of the terminal receives the ultrasonic analog signal, the wake-up module 603 is triggered to acquire the sensor data information of the sensor of the terminal; and if the acquired sensor data information meets the preset condition, the ultrasonic receiving module 6041 is waked up to receive and record the ultrasonic analog signal. Upon the reception of the ultrasonic analog signal, the ultrasonic receiving module 6041 transmits the received ultrasonic analog signal to the analog-to-digital conversion module 604 for analog-to-digital conversion to obtain the ultrasonic digital signal; and then, the ultrasonic digital signal subjected to the analog-to-digital conversion is transmitted to the decoder 605 for decoding as well as subsequent security verification, payment and other functions.

The ultrasonic receiving module may be a functional module that is disposed independently, and may also be disposed in a certain functional module. For example, in the schematic diagram that the terminal receives the ultrasonic signal, i.e., the payment instruction information, as illustrated in FIG. 5, the ultrasonic receiving module 6041 is disposed in the analog-to-digital conversion module 604.

The wake-up module 603 executes the method for controlling the functional module provided by the present disclosure to determine whether to wake up the ultrasonic receiving module 6041.

In the method for controlling the functional module provided by the present disclosure, the wake-up preset condition is set for the ultrasonic receiving module, and the ultrasonic receiving module is waked up after the preset condition is met, the mode in which the ultrasonic receiving module is in the working state all the time or the ultrasonic receiving module needs to be manually called is avoided, the power loss of the terminal is reduced and the user experience is improved.

Figure 7:
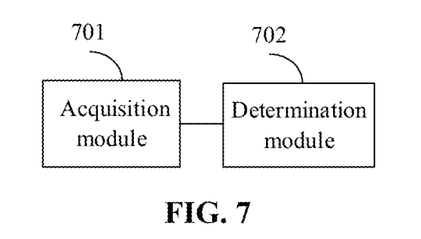
FIG. 7 is a block diagram of an apparatus for controlling a functional module, according to an exemplary embodiment.

FIG. 7 is a block diagram of an apparatus for controlling a functional module, according to an exemplary embodiment. Referring to FIG. 7, the apparatus may include an acquisition module 701 and a determination module 702.

The acquisition module 701 is configured to acquire sensor data information of a sensor.

The wake-up module 702 is configured to wake up the functional module to receive an ultrasonic signal in response to the acquired sensor data information meeting a preset condition.

The sensor data information may include inertial sensor data.

The acquisition module 701 is configured to acquire N pieces of inertial sensor data of the terminal within a preset duration, the N being a positive integer greater than or equal to 1.

The wake-up module 702 is configured to wake up the functional module to receive the ultrasonic signal in response to each of the N pieces of inertial sensor data meeting a preset threshold.

The N pieces of inertial sensor data may include N pieces of acceleration sensor data, and each piece of acceleration sensor data may include: acceleration sensor data of the terminal on an X axis, acceleration sensor data of the terminal on a Y axis and acceleration sensor data of the terminal on a Z axis.

The wake-up module 702 is configured to wake up the functional module to receive the ultrasonic signal in response to the acceleration sensor data of the terminal on the X axis, the acceleration sensor data of the terminal on the Y axis and the acceleration sensor data of the terminal on the Z axis respectively meeting corresponding first preset thresholds.

The N pieces of inertial sensor data may include N pieces of angular velocity sensor data, and each piece of angular velocity sensor data may include: angular velocity sensor data of the terminal on the X axis, angular velocity sensor data of the terminal on the Y axis and angular velocity sensor data of the terminal on the Z axis.

The wake-up module 702 is configured to wake up the functional module to receive the ultrasonic signal in response to the angular velocity sensor data of the terminal on the X axis, the angular velocity sensor data of the terminal on the Y axis and the angular velocity sensor data of the terminal on the Z axis respectively meeting corresponding second preset thresholds.

The acquisition module 701 is configured to perform at least one of: continuously acquiring the N pieces of inertial sensor data of the terminal; or acquiring the N pieces of inertial sensor data of the terminal according to a preset rule.

The functional module may include an ultrasonic receiving module 6041.

The wake-up module 702 is configured to send a wake-up instruction to the ultrasonic receiving module in response to the acquired sensor data information meeting the preset condition, to cause the ultrasonic receiving module to turn on a recording function to receive and record the ultrasonic signal.

For the apparatus in the above embodiments, the specific manner for the operation executed by each module has been described in detail in the embodiments related to the method, and is not repeated herein.

Figure 8:
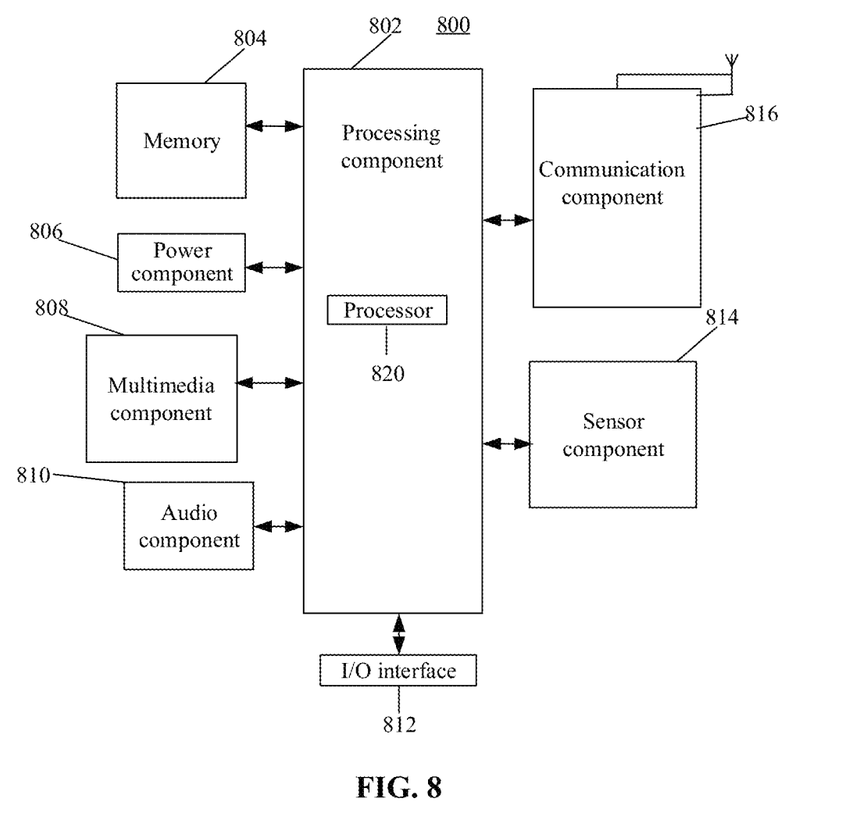
FIG. 8 is a block diagram of an apparatus for controlling a functional module, according to an exemplary embodiment (a general structure of a mobile terminal).

FIG. 8 is a block diagram of an apparatus 800 for controlling a functional module, according to an embodiment. For example, the apparatus 800 may be a mobile phone, a computer, a digital broadcast terminal, a messaging device, a gaming console, a tablet, a medical device, exercise equipment, a PDA, and the like.

Referring to FIG. 8, the apparatus 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the apparatus 800. The power component 806 may include a power management system, one or more power supplies, and other components associated with generation, management and distribution of power for the apparatus 800.

The multimedia component 808 includes a screen providing an output interface between the apparatus 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the apparatus 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to, a home button, a volume button, a starting button and a locking button.

The sensor component 814 includes one or more sensors configured to provide status assessments in various aspects for the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a communication-standard-based wireless network, such as a wireless fidelity (WiFi) network, a 2nd-generation (2G) or 3rd-generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute any abovementioned methods.

In an exemplary embodiment, there is also provided a non-transitory computer-readable storage medium including instructions, such as included in the memory 804, executable by the processing component 820 of the apparatus 800 for performing any abovementioned methods. For example, the non-transitory computer-readable storage medium may be a ROM, a random access memory (RAM), a compact disc read-only memory (CD-ROM), a magnetic tape, a floppy disc, an optical data storage device, and the like.

N pieces of inertial sensor data of the terminal are acquired within a preset duration, the N being a positive integer greater than or equal to 1.

A condition for calling the module is determined when each of the N pieces of inertial sensor data meets a preset threshold.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for controlling a functional circuit, comprising:
   acquiring, by a terminal, sensor data information of a sensor; and
   waking up, by the terminal, the functional circuit in the terminal to receive an ultrasonic signal in response to only determining that the acquired sensor data information meets a preset condition;
   wherein the sensor data information comprises inertial sensor data;
   wherein acquiring the sensor data information of the sensor comprises:
   acquiring one or more pieces of inertial sensor data of the terminal within a preset duration; and
   wherein waking up the functional circuit to receive the ultrasonic signal in response to determining that the acquired sensor data information meets the preset condition comprises:
   waking up the functional circuit to receive the ultrasonic signal in response to determining that each of the one or more pieces of inertial sensor data meets a preset threshold; and
   in response to determining that the terminal is disposed in a mode in which the terminal forms a preset angle with a horizontal plane with a screen downward, setting the preset threshold as a numerical range related to the preset angle.

2. The method of claim 1, wherein a number of the one or more pieces of inertial sensor data is N, N is a positive integer, the one or more pieces of inertial sensor data comprise N pieces of acceleration sensor data, and each piece of acceleration sensor data comprises acceleration sensor data of the terminal on an X axis, acceleration sensor data of the terminal on a Y axis, and acceleration sensor data of the terminal on a Z axis; and
   wherein waking up the functional circuit to receive the ultrasonic signal in response to determining that each of the one or more pieces of inertial sensor data meets the preset threshold comprises:
   waking up the functional circuit to receive the ultrasonic signal in response to determining that the acceleration sensor data of the terminal on the X axis, the acceleration sensor data of the terminal on the Y axis, and the acceleration sensor data of the terminal on the Z axis respectively meet a first preset threshold.

3. The method of claim 1, wherein a number of the one or more pieces of inertial sensor data is N, N is a positive integer, the one or more pieces of inertial sensor data comprise N pieces of angular velocity sensor data, and each piece of angular velocity sensor data comprises angular velocity sensor data of the terminal on an X axis, angular velocity sensor data of the terminal on a Y axis, and angular velocity sensor data of the terminal on a Z axis; and
   wherein waking up the functional circuit to receive the ultrasonic signal in response to determining that each of the one or more pieces of inertial sensor data meets the preset threshold comprises:
   waking up the functional circuit to receive the ultrasonic signal in response to determining that the angular velocity sensor data of the terminal on the X axis, the angular velocity sensor data of the terminal on the Y axis, and the angular velocity sensor data of the terminal on the Z axis respectively meet a second preset threshold.

4. The method of claim 1, wherein acquiring the one or more pieces of inertial sensor data of the terminal within the preset duration comprises at least one of following acts:
   continuously acquiring the one or more pieces of inertial sensor data of the terminal; or
   acquiring the one or more pieces of inertial sensor data of the terminal according to a preset rule.

5. The method of claim 1, wherein the functional circuit comprises an ultrasonic receiver; and
   wherein waking up the functional circuit to receive the ultrasonic signal in response to determining that the acquired sensor data information meets the preset condition comprises:
   sending, in response to determining that the acquired sensor data information meets the preset condition, a wake-up instruction to the ultrasonic receiver, such that the ultrasonic receiver turns on a recording function to receive and record the ultrasonic signal.

6. The method of claim 1, wherein the ultrasonic signal includes payment instruction information, and the functional circuit receiving the payment instruction information is waked up.

7. A terminal, comprising:
   a processor; and
   a memory configured to store instructions executable by the processor;
   wherein the processor is configured to:
   acquire sensor data information of a sensor; and
   wake up a functional circuit in the terminal to receive an ultrasonic signal in response to only determining that the acquired sensor data information meets a preset condition;
   wherein the sensor data information comprises inertial sensor data;

wherein the processor is further configured to:
acquire one or more pieces of inertial sensor data of the terminal within a preset duration; and
wake up the functional circuit to receive the ultrasonic signal in response to determining that each of the one or more pieces of inertial sensor data meets a preset threshold; and
in response to determining that the terminal is disposed in a mode in which the terminal forms a preset angle with a horizontal plane with a screen downward, setting the preset threshold as a numerical range related to the preset angle.

8. The terminal of claim 7, wherein a number of the one or more pieces of inertial sensor data is N, N is a positive integer, the one or more pieces of inertial sensor data comprise N pieces of acceleration sensor data, and each piece of acceleration sensor data comprises acceleration sensor data of the terminal on an X axis, acceleration sensor data of the terminal on a Y axis, and acceleration sensor data of the terminal on a Z axis; and
wherein the processor is configured to wake up the functional circuit to receive the ultrasonic signal in response to determining that the acceleration sensor data of the terminal on the X axis, the acceleration sensor data of the terminal on the Y axis, and the acceleration sensor data of the terminal on the Z axis respectively meet a first preset threshold.

9. The terminal of claim 7, wherein a number of the one or more pieces of inertial sensor data is N, N is a positive integer, the one or more pieces of inertial sensor data comprise N pieces of angular velocity sensor data, and each piece of angular velocity sensor data comprises angular velocity sensor data of the terminal on an X axis, angular velocity sensor data of the terminal on a Y axis, and angular velocity sensor data of the terminal on a Z axis; and
wherein the processor is configured to wake up the functional circuit to receive the ultrasonic signal in response to determining that the angular velocity sensor data of the terminal on the X axis, the angular velocity sensor data of the terminal on the Y axis, and the angular velocity sensor data of the terminal on the Z axis respectively meet a second preset threshold.

10. The terminal of claim 7, wherein the processor is configured to perform at least one of following acts:
continuously acquiring the one or more pieces of inertial sensor data of the terminal; or
acquiring the one or more pieces of inertial sensor data of the terminal according to a preset rule.

11. The terminal of claim 7, wherein the functional circuit comprises an ultrasonic receiver, and the processor is further configured to send, in response to determining that the acquired sensor data information meets the preset condition, a wake-up instruction to the ultrasonic receiver, such that the ultrasonic receiver turns on a recording function to receive and record the ultrasonic signal.

12. A non-transitory computer-readable storage medium, wherein instructions in the storage medium being executed by a processor of a mobile terminal, to cause the mobile terminal to perform acts comprising:
acquiring sensor data information of a sensor; and
waking up a functional circuit in the mobile terminal to receive an ultrasonic signal in response to only determining that the acquired sensor data information meets a preset condition;
wherein the sensor data information comprises inertial sensor data;
wherein acquiring the sensor data information of the sensor comprises:
acquiring one or more pieces of inertial sensor data of the terminal within a preset duration; and
wherein waking up the functional circuit to receive the ultrasonic signal in response to determining that the acquired sensor data information meets the preset condition comprises:
waking up the functional circuit to receive the ultrasonic signal in response to determining that each of the one or more pieces of inertial sensor data meets a preset threshold; and
in response to determining that the terminal is disposed in a mode in which the terminal forms a preset angle with a horizontal plane with a screen downward, setting the preset threshold as a numerical range related to the preset angle.

13. The non-transitory computer-readable storage medium of claim 12, wherein a number of the one or more pieces of inertial sensor data is N, N is a positive integer, the one or more pieces of inertial sensor data comprise N pieces of acceleration sensor data, and each piece of acceleration sensor data comprises acceleration sensor data of the terminal on an X axis, acceleration sensor data of the terminal on a Y axis, and acceleration sensor data of the terminal on a Z axis; and
wherein waking up the functional circuit to receive the ultrasonic signal in response to determining that each of the one or more pieces of inertial sensor data meets the preset threshold comprises:
waking up the functional circuit to receive the ultrasonic signal in response to determining that the acceleration sensor data of the terminal on the X axis, the acceleration sensor data of the terminal on the Y axis, and the acceleration sensor data of the terminal on the Z axis respectively meet a first preset threshold.

14. The non-transitory computer-readable storage medium of claim 12, wherein a number of the one or more pieces of inertial sensor data is N, N is a positive integer, the one or more pieces of inertial sensor data comprise N pieces of angular velocity sensor data, and each piece of angular velocity sensor data comprises angular velocity sensor data of the terminal on an X axis, angular velocity sensor data of the terminal on a Y axis, and angular velocity sensor data of the terminal on a Z axis; and
wherein waking up the functional circuit to receive the ultrasonic signal in response to determining that each of the one or more pieces of inertial sensor data meets the preset threshold comprises:
waking up the functional circuit to receive the ultrasonic signal in response to determining that the angular velocity sensor data of the terminal on the X axis, the angular velocity sensor data of the terminal on the Y axis, and the angular velocity sensor data of the terminal on the Z axis respectively meet a second preset threshold.

15. The non-transitory computer-readable storage medium of claim 12, wherein acquiring the one or more pieces of inertial sensor data of the terminal within the preset duration comprises at least one of following acts:
continuously acquiring the one or more pieces of inertial sensor data of the terminal; or
acquiring the one or more pieces of inertial sensor data of the terminal according to a preset rule.

16. The non-transitory computer-readable storage medium of claim 12, wherein the functional circuit comprises an ultrasonic receiver; and wherein waking up the functional circuit to receive the ultrasonic signal in response to determining that the acquired sensor data information meets the preset condition comprises:

sending, in response to determining that the acquired sensor data information meets the preset condition, a wake-up instruction to the ultrasonic receiver, such that the ultrasonic receiver turns on a recording function to receive and record the ultrasonic signal.

* * * * *